US012434369B2

(12) United States Patent
Liu et al.

(10) Patent No.: US 12,434,369 B2
(45) Date of Patent: Oct. 7, 2025

(54) HANDLE FOR USE WITH A POWER TOOL

(71) Applicant: TECHTRONIC CORDLESS GP, Anderson, SC (US)

(72) Inventors: Shi Chun Liu, Dongguan (CN); Jin Hua Gao, Dongguan (CN)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 18/550,835

(22) PCT Filed: May 14, 2021

(86) PCT No.: PCT/CN2021/093777
§ 371 (c)(1),
(2) Date: Sep. 15, 2023

(87) PCT Pub. No.: WO2022/236800
PCT Pub. Date: Nov. 17, 2022

(65) Prior Publication Data

US 2024/0165782 A1 May 23, 2024

(51) Int. Cl.
*B25D 17/04* (2006.01)

(52) U.S. Cl.
CPC .................................. *B25D 17/043* (2013.01)

(58) Field of Classification Search
CPC .............................. B25F 5/026; B25D 17/043
See application file for complete search history.

(56) References Cited

U.S. PATENT DOCUMENTS

| | | | |
|---|---|---|---|
| 4,371,043 | A | 2/1983 | Kubokawa |
| 5,157,807 | A | 10/1992 | Keller et al. |
| 5,273,120 | A | 12/1993 | Chang |
| 6,026,910 | A | 2/2000 | Masterson et al. |
| 6,220,367 | B1 | 4/2001 | Masterson et al. |
| 6,981,625 | B2 | 1/2006 | Schad |
| 7,137,542 | B2 | 11/2006 | Oki et al. |
| 7,252,156 | B2 | 8/2007 | Sugiyama et al. |

(Continued)

FOREIGN PATENT DOCUMENTS

| | | |
|---|---|---|
| CN | 201841532 U | 5/2011 |
| CN | 204308242 U | 5/2015 |

(Continued)

OTHER PUBLICATIONS

Translation of WO 2009/083303 A1 (Year: 2009).*
International Search Report and Written Opinion for Application No. PCT/CN2021/093777 dated Feb. 15, 2022 (6 pages).

*Primary Examiner* — Thomas M Wittenschlaeger
(74) *Attorney, Agent, or Firm* — Michael Best & Friedrich LLP

(57) ABSTRACT

A handle (200) for use with a power tool (100) having a coupling portion (204) and a gripping portion (206), a connector (228) for connecting the gripping portion (206) to the coupling portion (204), and a resilient deformable member (256) provided with and extended along the gripping portion (206). The coupling portion (204) is configured to detachably couple the handle (200) to the power tool (100). The gripping portion (206) is in connection with the coupling portion (204) for gripping by a user. The resilient deformable member (256) and the gripping portion (206) are integrated along length for simultaneous deformation.

19 Claims, 7 Drawing Sheets

(56) References Cited

U.S. PATENT DOCUMENTS

| | | | | |
|---|---|---|---|---|
| 7,740,087 | B2 | 6/2010 | Krondorfer et al. | |
| 7,770,262 | B2 | 8/2010 | Schultz et al. | |
| 8,210,276 | B2 | 7/2012 | Krondorfer et al. | |
| 8,256,528 | B2 | 9/2012 | Oesterle et al. | |
| 8,430,183 | B2 | 4/2013 | Di Nicolantonio et al. | |
| 8,511,658 | B2 * | 8/2013 | Moessnang | B25F 5/006 267/169 |
| 8,522,594 | B2 | 9/2013 | Okabe et al. | |
| 8,522,894 | B2 | 9/2013 | Kraenzler et al. | |
| 8,695,724 | B2 | 4/2014 | Nakashima | |
| 8,813,868 | B2 | 8/2014 | Limberg et al. | |
| 8,914,947 | B2 | 12/2014 | Weiss | |
| 8,967,923 | B2 | 3/2015 | Lerch et al. | |
| 9,242,363 | B2 | 1/2016 | Moessnang et al. | |
| 9,358,677 | B2 | 6/2016 | Kuhnle et al. | |
| 9,370,860 | B2 | 6/2016 | Rieger et al. | |
| 9,463,566 | B2 | 10/2016 | Yoshikane et al. | |
| 9,694,484 | B2 | 7/2017 | Braun | |
| 9,776,296 | B2 | 10/2017 | Brewster et al. | |
| 9,815,185 | B2 | 11/2017 | Machida | |
| 9,962,823 | B2 | 5/2018 | Machida | |
| 10,071,468 | B2 | 9/2018 | Kuhnle et al. | |
| 10,179,400 | B2 | 1/2019 | Furusawa et al. | |
| 10,272,559 | B2 | 4/2019 | Friedrich et al. | |
| 10,406,668 | B2 | 9/2019 | Weber et al. | |
| 10,695,880 | B2 | 6/2020 | Brewster et al. | |
| 2004/0016082 | A1 | 1/2004 | Yi | |
| 2005/0284646 | A1 | 12/2005 | Bacila | |
| 2007/0289761 | A1 | 12/2007 | Kumpf et al. | |
| 2008/0148524 | A1 | 6/2008 | Wiker et al. | |
| 2009/0038120 | A1 | 2/2009 | Eicher et al. | |
| 2009/0038121 | A1 | 2/2009 | Eicher et al. | |
| 2009/0038818 | A1 | 2/2009 | Eicher et al. | |
| 2009/0039576 | A1 | 2/2009 | Eicher et al. | |
| 2009/0064829 | A1 | 3/2009 | Frank et al. | |
| 2009/0178243 | A1 | 7/2009 | Frank et al. | |
| 2010/0206595 | A1 | 8/2010 | Kamegai | |
| 2011/0005790 | A1 | 1/2011 | Frank et al. | |
| 2011/0011609 | A1 | 1/2011 | Simm et al. | |
| 2014/0326476 | A1 | 11/2014 | Limberg et al. | |
| 2016/0129579 | A1 * | 5/2016 | Friedrich | B25D 17/043 173/162.2 |
| 2020/0122280 | A1 | 4/2020 | Limberg et al. | |
| 2020/0149609 | A1 | 5/2020 | Zhang | |
| 2020/0198112 | A1 * | 6/2020 | Sun | B25F 5/026 |
| 2020/0324380 | A1 | 10/2020 | Brewster et al. | |

FOREIGN PATENT DOCUMENTS

| | | | | |
|---|---|---|---|---|
| CN | 204954772 | U | 1/2016 | |
| CN | 105345753 | A | 2/2016 | |
| CN | 205362770 | U | 7/2016 | |
| CN | 206501082 | U | 9/2017 | |
| CN | 206780332 | U | 12/2017 | |
| CN | 207997286 | U | 10/2018 | |
| CN | 208195742 | U | 12/2018 | |
| CN | 209579434 | U | 11/2019 | |
| CN | 210061015 | U | 2/2020 | |
| CN | 211362142 | U | 8/2020 | |
| CN | 211614413 | U | 10/2020 | |
| CN | 212020649 | U | 11/2020 | |
| DE | 2804223 | A1 | 8/1979 | |
| DE | 4132058 | A1 | 4/1993 | |
| DE | 10236135 | A1 | 2/2004 | |
| DE | 10348973 | A1 | 5/2005 | |
| DE | 10348975 | A1 | 5/2005 | |
| DE | 10348976 | A1 | 5/2005 | |
| DE | 102007060946 | A1 | 6/2009 | |
| DE | 102007062716 | A1 | 7/2009 | |
| DE | 102007062719 | A1 | 7/2009 | |
| DE | 102008054459 | A1 | 6/2010 | |
| DE | 102012218952 | A1 | 4/2013 | |
| EP | 0237842 | A2 | 9/1987 | |
| EP | 2105261 | A1 | 9/2009 | |
| EP | 2159009 | A1 | 3/2010 | |
| EP | 2253430 | A1 | 11/2010 | |
| EP | 3213879 | A1 | 9/2017 | |
| EP | 3608064 | A1 | 2/2020 | |
| JP | 2010264532 | A | 11/2010 | |
| WO | 2009019052 | A1 | 2/2009 | |
| WO | 2009019053 | A1 | 2/2009 | |
| WO | 2009047185 | A2 | 4/2009 | |
| WO | 2009047187 | A2 | 4/2009 | |
| WO | 2009065681 | A2 | 5/2009 | |
| WO | 2009074387 | A2 | 6/2009 | |
| WO | 2009083299 | A1 | 7/2009 | |
| WO | 2009083308 | A1 | 7/2009 | |
| WO | 2009083309 | A1 | 7/2009 | |
| WO | 2009083338 | A1 | 7/2009 | |
| WO | 2009083341 | A1 | 7/2009 | |
| WO | 2009089961 | A1 | 7/2009 | |
| WO | 2009092486 | A1 | 7/2009 | |
| WO | WO-2009083303 | A1 * | 7/2009 | B25D 17/043 |
| WO | 2009106165 | A1 | 9/2009 | |
| WO | 2017021210 | A1 | 2/2017 | |
| WO | 2020016078 | A1 | 1/2020 | |

* cited by examiner

HANDLE FOR USE WITH A POWER TOOL

TECHNICAL FIELD

The invention relates to a handle for use with a power tool.

BACKGROUND

Typically, handheld power tools include a handle formed on or fixed to a housing of the tool for a user to grasp and guide the tool during operation. Some tools may, additionally, be provided with an auxiliary handle, allowing the user to grasp the tool with both hands, providing the required additional control and leverage to complete operations such as drilling and fastening.

During operation of the tool, vibration may be generated at the tool bit or the like working on the workpiece, and transferred to the other portions of the tool including both handles, and to the hands and arms of the user, increasing fatigue of the user.

An object of the present invention is to address the above problem, to overcome or substantially ameliorate the above disadvantages or, more generally, to provide a vibration damping handle for use with a power tool.

SUMMARY

In a first aspect, there is provided a handle for use with a power tool, comprising a coupling portion and a gripping portion, a connector for connecting the gripping portion to the coupling portion, and a resilient deformable member provided with and extended along the gripping portion. The coupling portion is configured to detachably couple the handle to said power tool. The gripping portion is in connection with the coupling portion for gripping by a user. The resilient deformable member and the gripping portion are integrated along length for simultaneous deformation.

In one embodiment of the first aspect, the resilient deformable member and the gripping portion are integrated continuously or at discrete positions along the length for flexing in unison.

In one embodiment of the first aspect, the resilient deformable member is in engagement with the connector to function as a cantilever for damping vibration from the coupling portion to the gripping portion.

In one embodiment of the first aspect, the gripping portion includes a body with a cavity for receiving the resilient deformable member that extends along length of the gripping portion.

In one embodiment of the first aspect, the cavity and the resilient deformable member are shaped complementarily and extend along length of the gripping portion in unison.

In one embodiment of the first aspect, the resilient deformable member takes the form of a helix.

In one embodiment of the first aspect, the body includes a void that extends along length of the gripping member.

In one embodiment of the first aspect, the resilient deformable member, the cavity and the void extend co-axially in the body along length of the gripping portion.

In one embodiment of the first aspect, the resilient deformable member runs around the void in a configuration that the resilient deformable member is displaced at a constant distance from the void along its length.

In one embodiment of the first aspect, the connector includes a shaft that spans across the coupling portion and the gripping portion.

In one embodiment of the first aspect, at least a first end portion of the shaft extends into the void of the gripping member.

In one embodiment of the first aspect, the first portion of the shaft is maintained in suspension within the void of the gripping member.

In one embodiment of the first aspect, the connector is in connection with the resilient deformable member via a coupler.

In one embodiment of the first aspect, the resilient deformable member is fixedly joined with the coupler to form a one piece structure.

In one embodiment of the first aspect, the shaft is inserted into the coupler for coupling therewith.

In one embodiment of the first aspect, the handle further includes a guard located at an end portion of the coupling portion and in proximity to the coupler for guarding against it.

In one embodiment of the first aspect, a second end portion of the shaft includes a formation which is received by a receiver of the coupling portion for fixed engagement.

In one embodiment of the first aspect, the resilient deformable member extends along substantially entire length of the gripping portion.

In one embodiment of the first aspect, the void extends along entire length of the gripping portion.

In one embodiment of the first aspect, the guard and the coupler are arranged concentrically on the shaft.

In one embodiment of the first aspect, the gripping portion is made of a material selected from a group containing elastomer and rubber.

In one embodiment of the first aspect, the gripping portion and the coupling portion are arranged on a same axis.

In one embodiment of the first aspect, the resilient deformable member, the cavity and the void extend along the same axis.

In a second aspect, there is provided a power tool including a main handle and an auxiliary handle configured as the handle in accordance with the first aspect. The power tool may be a rotary hammer or drill.

BRIEF DESCRIPTION OF THE DRAWINGS

Embodiments of the invention will now be described, by way of example, with reference to the accompanying drawings in which.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Terms of degree, such as "substantially" or "generally" are understood by those of ordinary skill to refer to reasonable ranges outside of the given value, for example, general tolerances associated with manufacturing, assembly, and use of the described embodiments.

Figure 1:
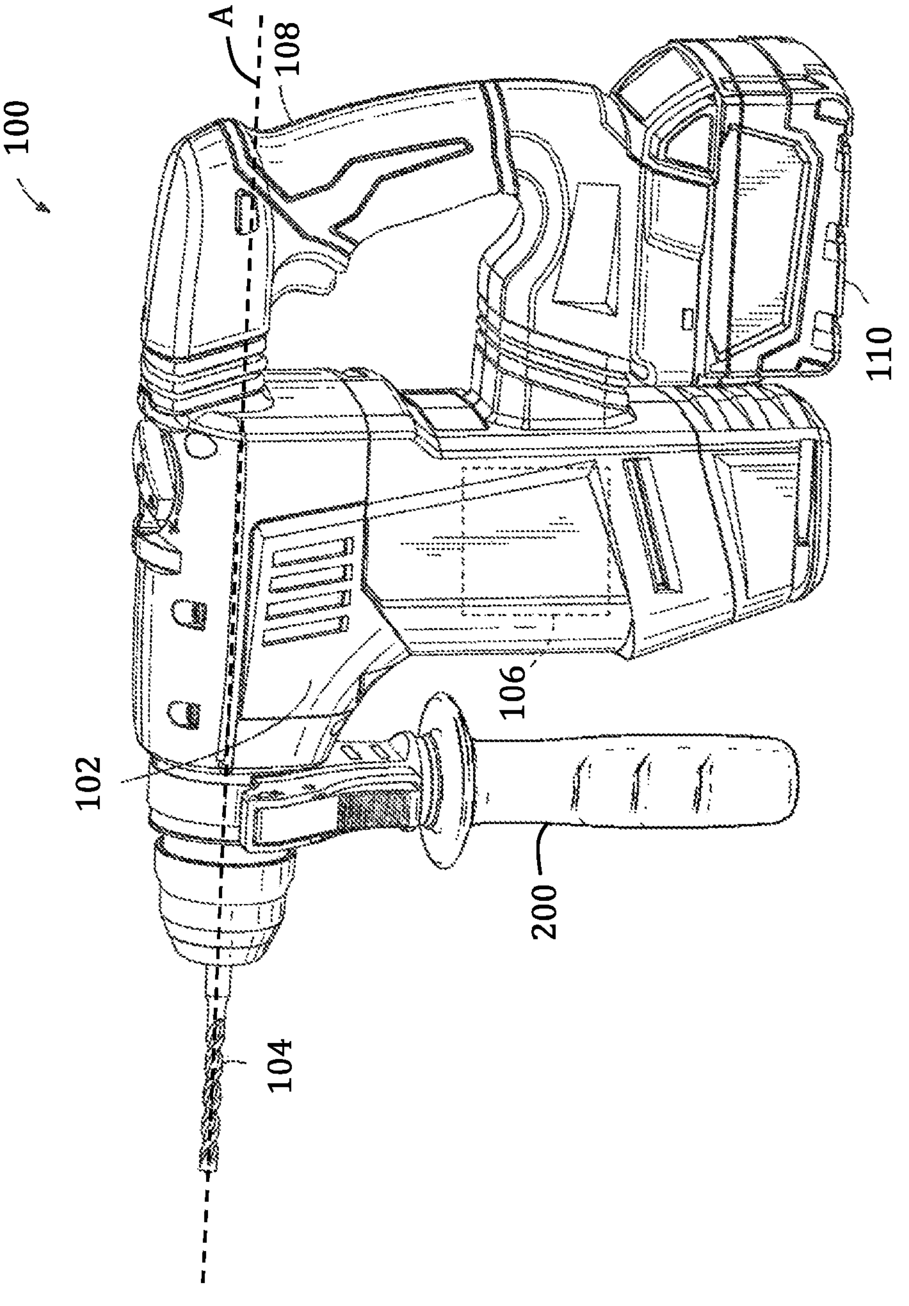
FIG. 1 is a perspective view of a power tool with a handle in accordance with an embodiment of the invention.
Figure 2:
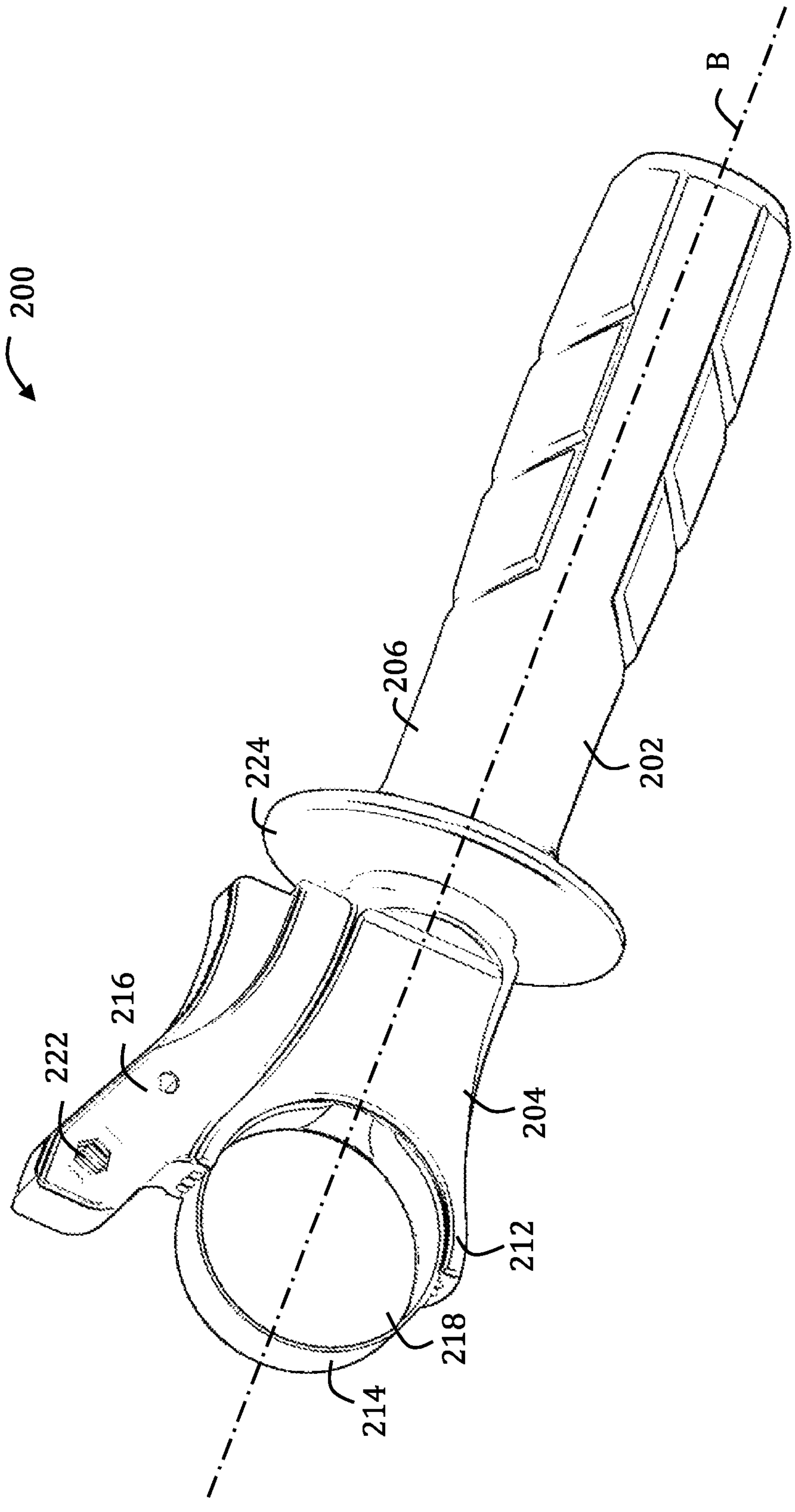
FIG. 2 is a perspective view of the handle of FIG. 1.
Figure 3:
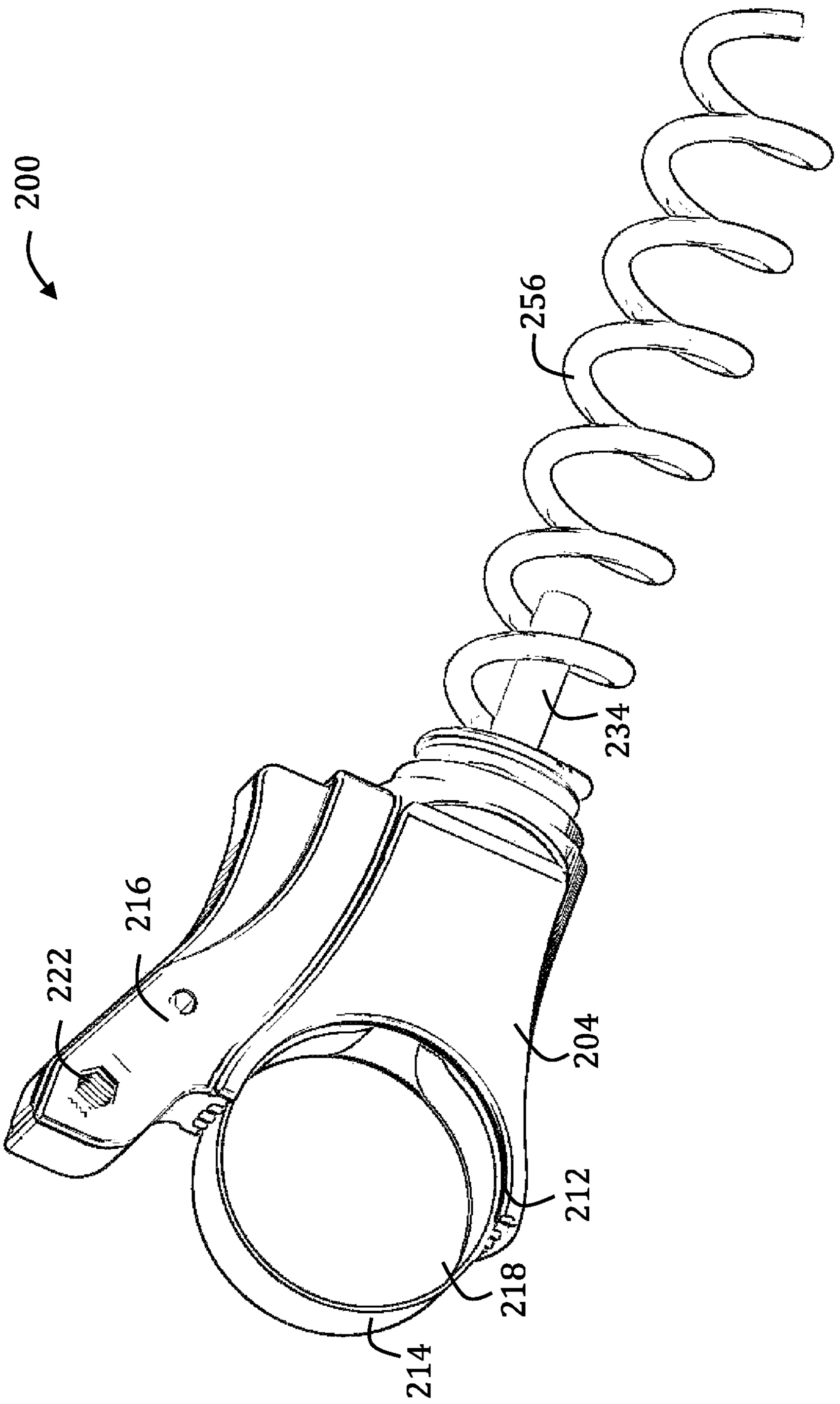
FIG. 3 is a perspective view of the handle of FIG. 1, with a portion of the gripping portion removed.
Figure 4:
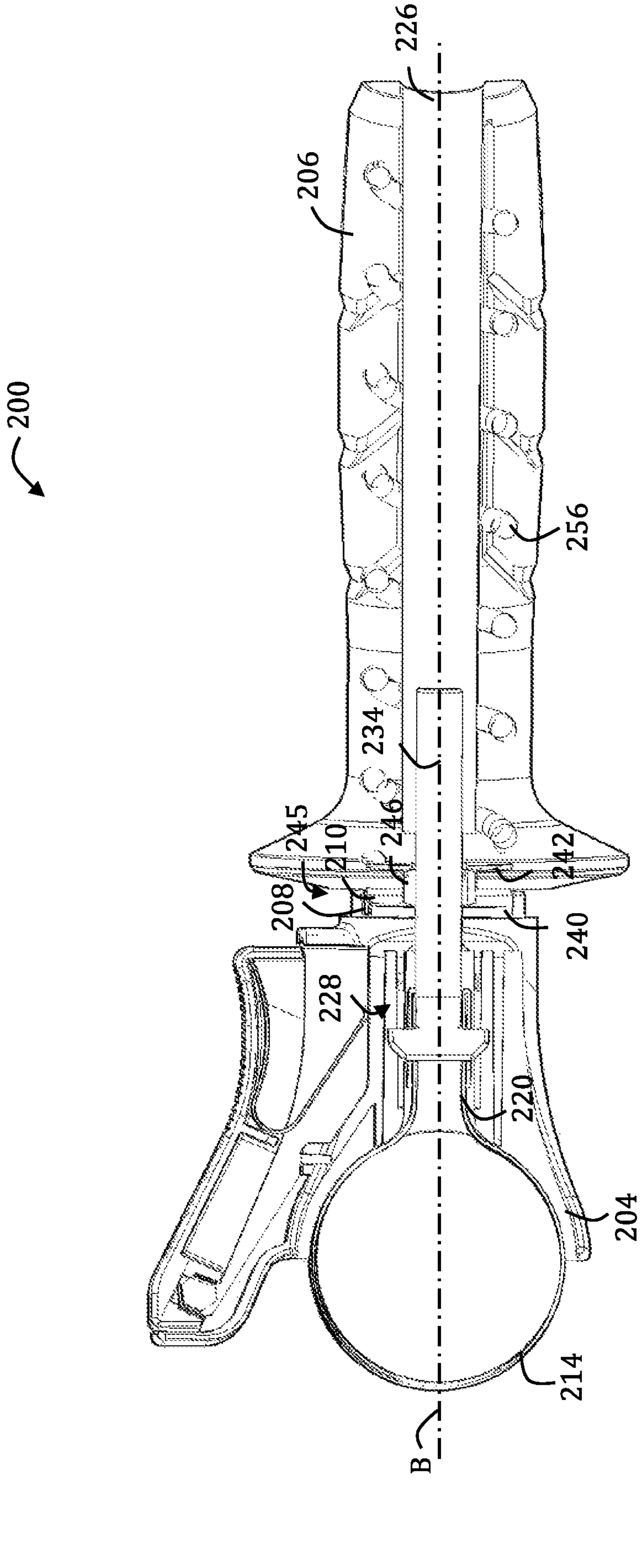
FIG. 4 is a cross-sectional view of the handle of FIG. 1.
Figure 5:
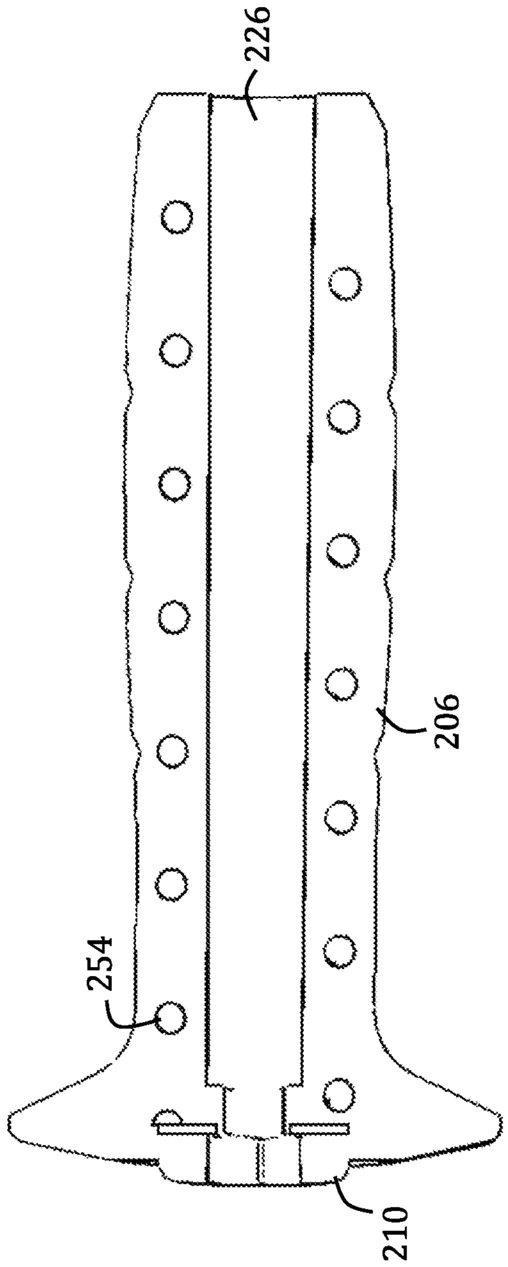
FIG. 5 is a cross-sectional view of a portion of the gripping portion of FIG. 1.
Figure 6:
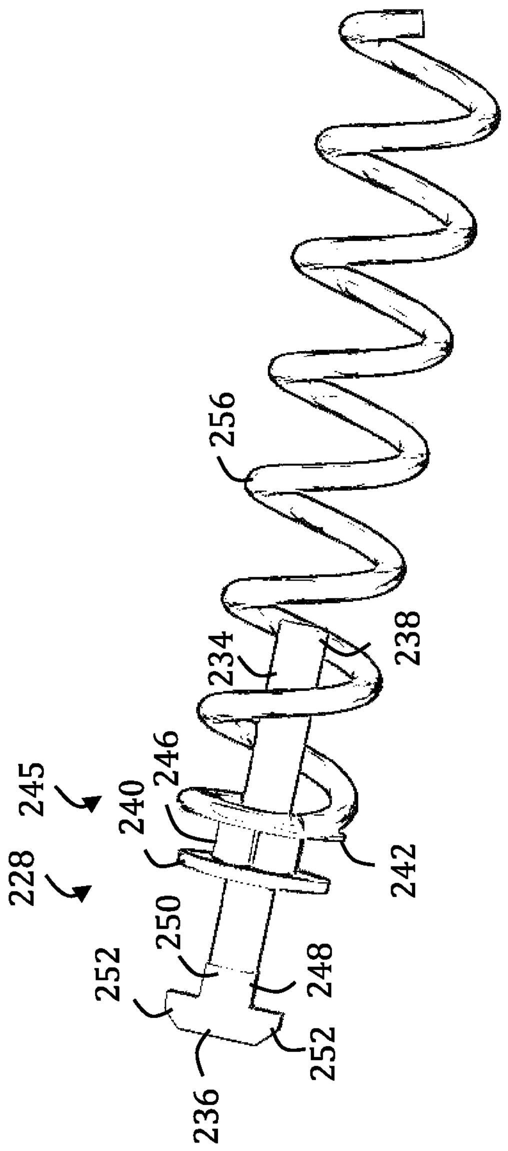
FIG. 6 is a perspective view of a connector and a resilient deformable member of the handle of FIG. 1.

FIG. 1 shows a power tool, in the form of a rotary hammer 100, with a handle 200 in accordance with an embodiment of the invention. The rotary hammer 100 includes a housing 102, a tool bit (e.g., a drill bit) 104 defining a working axis A and removably coupled to the housing 102 for performing work on a workpiece (not shown), and a motor 106 disposed within the housing 102 and coupled to the tool bit 104 for transmitting torque to the tool bit 104. The rotary hammer 100 also includes a main handle 108 coupled to the housing 102 opposite to the tool bit 104 and including a battery receptacle for removably receiving a rechargeable battery pack 110 for providing electrical power to activate a drive mechanism (not shown) and the motor 106 disposed within the housing 102, for operating (e.g., impacting or rotating) the tool bit 104. The main handle 108 may be provided with an over-moulded gripping portion to provide increased user comfort. In addition to the main handle 108, the rotary hammer 100 also includes an auxiliary handle 200 detachably coupled to the housing 102 between the main handle 108 and the tool bit 104 proximate the tool bit 104, such that the user may hold the rotary hammer 100 with both hands and with different orientations and angles relative to the main handle 108 during operation, facilitating balance, manage, and control of the rotary hammer 100.

Operation of the rotary hammer 100 may produce vibration at least due to the rotation motion and the reciprocating motion of the drive mechanism and intermittent contact between the tool bit 104 and the workpiece. Such vibration may generally occur along the working axis A of the tool bit 104. Depending on the use of the rotary hammer 100 and the orientation and angle of the auxiliary handle 200 relative to the main handle 108, vibration may also occur along a direction orthogonal to the direction of the working axis A. In the illustrated embodiment, the auxiliary handle 200 helps attenuate the vibration being transferred from the tool bit 104 to the auxiliary handle 200, and therefore to the user of the rotary hammer 100.

Referring to FIGS. 2 to 6, the auxiliary handle 200 includes an elongate body 202 defining a main axis B and having a coupling portion 204 configured to detachably couple the handle 200 to the rotary hammer 100, and a gripping portion 206 in connection with the coupling portion 204 along the main axis B of the handle 200 for gripping by the user. In this embodiment, the gripping portion 206 is arranged in alignment with the coupling portion 204. The coupling portion 204 and the gripping portion 206 include complementary shape end portions, e.g., recess 208 and boss 210 (FIG. 4), via which they engage and connect. The coupling portion 204 includes a body 212, a clamp 214 extending from the body 212, and a depth adjustment member 216 provided on one side of the body 212. The depth adjustment member 216 spans across a substantial length of the body 212 and the clamp 214 on a same side. The clamp 214 is formed from a continuous strap of material, preferably metal. The clamp 214 includes a ring with an opened end. Two end portions of the strap at the opened end are arranged adjacent and parallel to one another. In other words, the two end portions extend from the open end of the ring to form a pair of arms that run parallel to each other. As such the clamp 214 may be considered to include, at one end, a circular opening 218 through which a portion of the housing 102 of the rotary hammer 100 adjacent the tool bit 104 can be inserted and clamped and, at the opposite end, two arms 220 (FIG. 4) extending away from the opening 218 and being configured to facilitate coupling with the gripping portion 206, as will be discussed later. The depth adjustment member 216 includes a hole 222 for receiving a rod (not shown). A releasable lock is provided to allow for movement of the rod in the hole 222 and to lock the rod in place when the rod is moved to a desired position.

The gripping portion 206 has a generally cylindrical body with an expanded head. The gripping portion 206 may be made of (e.g. injection-moulded or over-moulded with) an anti-vibration material selected from a group containing elastomer and rubber for damping vibration transferred thereto. An outer surface of the gripping portion 206 has a grip enhancing formation or has a grip enhancing configuration, which enhances gripping by increasing friction between the user's hand and the gripping portion 206. The expanded head of the gripping portion 206 is at the end in proximity to the coupling portion 204. It functions as a guard 224 to protect the hand of a user from the power tool 100. For example, the guard 224 may prevent the user's hand from gradually moving upwards towards the tool 100 and the tool bit 104 due to continuous vibration and oscillation of the tool 100 thus the handle 200 during operation.

The gripping portion 206 also includes a generally cylindrical elongated void 226 in the body extending centrally through and along substantially the entire length of the gripping portion 206. The elongated void 226 is configured to partially receive a connector 228 for connecting the gripping portion 206 to the coupling portion 204. The connector 228 includes a shaft 234 that spans across the gripping portion 206 and the coupling portion 204 to connect the two. The shaft 234 has two opposite end portions, i.e. first and second end portions. The first end portion extends into and is received in the void 226 of the gripping portion 206. The second end portion is inserted into and received in the coupling portion 204. The first end portion of the shaft 234 is a free end maintained in suspension within the void 226. The second end portion of the shaft 234 includes a formation 248 which is received by a receiver of the coupling portion 204 for fixed engagement therewith. The formation 248 is accommodated in a correspondingly shaped receiver (e.g. aperture) provided on the two arms 220 of the clamp 214 within the body 212 of the coupling portion 204 for fixed connection. Specifically, the formation 248 has a T-shaped enlarged end 250 with two opposite tip portions 252 extending substantially perpendicularly to a longitudinal axis of the shaft 234 thus the main axis B of the handle 200. The two tip portions 252 are each configured to engage with and hook onto respective apertures on each of the relevant arm 220 of the clamp 214, thereby fixedly connecting the connection end portion 236 with the coupling portion 204.

To fix the shaft 234 in position in use, the auxiliary handle 200 further includes a fastener or coupler (e.g. a flange nut) 245 that is coupled to the shaft 234. The flange nut 245 includes a nut portion 246 received within the boss 210 of the gripping portion 206, and a flange portion 242 integrally formed with the nut portion 246 and acting as a washer. The flange portion 242 is embedded in and fixed to the guard 224 of the gripping portion 206.

An annular washer or a guard 240 is separated from the nut 245. It is slightly thicker than the flange portion 242, and is provided between the coupling portion 204 and the gripping portion 206 at an end portion of the coupling portion 204 and in proximity to the coupler 245. The washer 240 guards against the coupler 245, and is used for separating and reducing friction between the coupling portion 204 and the gripping portion 206, thereby preventing damages to the coupling portion 204 by the nut 245 during operation of the power tool 100. The washer 240 is received in the recess 208 of the body 212 of the coupling portion 204. The nut 245 for fixing the shaft 234 is engaged with the annular washer 240, with the shaft 234 inserted into and extending through the washer 240, the nut portion 246, and the flange portion 242 from the body 212 of the coupling portion 204 into the void 226 of the gripping portion 206. The nut portion 246, the flange portion 242, as well as the annular washer 240 are arranged concentrically on the shaft 234.

In addition to the anti-vibration material, the auxiliary handle 200 is further provided with a resilient deformable member, e.g. a spring 256, to attenuate vibrations transferred from the coupling portion 204 to the gripping portion 206. The spring 256 is provided with and extended along the gripping portion 206. The spring 256 takes the form of a helix that runs around the void 226 in a configuration that the spring 256 is displaced at a constant distance from the void 226 along its length. The spring 256 is received in a cavity in the form of a helical channel 254 in the body of the gripping portion 206 that extends around and along the void 226, such that the void 226, the spring 256 and the helical channel 254 extend co-axially with the main axis B of the handle 200 in the body along length of the gripping portion 206. The spring 256 and the helical channel 254 are shaped complementarily and extend along length of the gripping portion in unison.

The spring 256 is in engagement and in connection with the connector 228 via the coupler 245, to function as a cantilever for damping vibrations from the coupling portion 204 to the gripping portion 206. Preferably, the spring 256 is fixedly coupled (i.e. welded) to the flange portion 242 of the nut 245 to form a single component. The spring 256 and the gripping portion 206 are also integrated continuously along substantially entire length for simultaneous deformation and flexing in unison, facilitating vibration attenuation along length of the gripping portion 206 during operation of the rotary hammer 100.

The gripping portion 206 with the helical channel 254 may be formed via injection moulding, with the spring 256 placed inside the mould before the molten anti-vibration material is injected into the mould. As such, the spring 256, the nut 245 are both embedded in the gripping portion 206, with the spring 256 tightly fitted in the helical channel 254.

Figure 7:
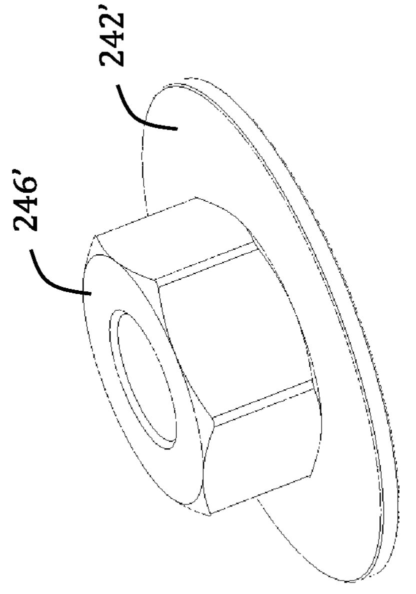
FIG. 7 is a perspective view of a nut and a washer in accordance with an embodiment of the invention.

FIG. 7 shows an alternative embodiment of a nut 246' and an annular washer 242' that may be used with the auxiliary handle 200. Different from the above embodiment with reference to FIGS. 2 to 6 where the nut portion 246 is integrally formed with the flange portion 242, the nut 246' and the annular washer 242' are separate components that are coupled together. The spring 256 may be joined with the washer 242' to form a single component, in the same manner described above. In this embodiment, the nut 246' for fixing the shaft 234 is sandwiched between and engaged with the annular washers 242', 240, with the shaft 234 extending through the washer 240, the nut 246', and the washer 242' from the body 212 of the coupling portion 204 into the void 226 of the gripping portion 206. The washer 242' and the nut 246' as well as the washer 240 are arranged concentrically on the shaft 234.

The embodiments of the present invention provides an auxiliary handle for use with a power tool that achieves vibration reduction. With the gripping portion being made of an anti-vibration material, the resilient deformable member, which is integrated with the gripping portion substantially along its entire length, allows vibration and oscillation transferred from the tool bit to the entire length of the handle from the clamp of the coupling portion to the end of the gripping portion via the connector and the spring to be maximally attenuated, thus greatly mitigating fatigue and discomfort of the user caused by such vibration.

It will be appreciated by persons skilled in the art that numerous variations and/or modifications may be made to the invention as shown in the specific embodiments without departing from the spirit or scope of the invention as broadly described.

For example, the illustrated handle may be used with a power tool other than the illustrated rotary hammer. For example, the handle may be used with other corded or cordless handheld power tools such as an angle grinder, a miter saw, a polishing machine, a drill, a hammer drill, etc. The handle may be integrally formed with the power tool. The handle may be used as a main handle of the power tool, instead of an auxiliary handle.

The handle may have a structure and shape different from the illustrated handle. For example, the coupling portion and the gripping portion may be integrally formed, and the connector may be omitted. Instead of extending along the entire length of the gripping portion, the elongated void in the gripping portion may partially extend the length of the gripping portion. The spring and the gripping portion may be integrated as discrete positions along length, provided that the spring and the gripping portion can flex in unison to reduce vibration transferred thereto. The connector and the resilient deformable member may be arranged offset to the main axis of the handle. Alternatively, the handle may include a plurality of resilient deformable members arranged circumferentially of the elongated void in the gripping portion. The spring and the flange nut or the nut and the washer may all be integrally formed as a one-piece structure. The resilient deformable member may have structures other than a spring, thus the helical channel receiving the resilient deformable member may also have other structures and shapes.

The described embodiments of the invention should therefore be considered in all respects as illustrative, not restrictive.

The invention claimed is:

1. A handle for use with a power tool, the handle comprising:

a coupling portion configured to detachably couple the handle to the power tool;

a gripping portion in connection with the coupling portion for gripping by a user;

a connector for connecting the gripping portion to the coupling portion; and a resilient deformable member provided with and extended along the gripping portion, wherein the resilient deformable member and the gripping portion are integrated along lengths thereof for simultaneous deformation;

wherein the gripping portion includes a body with a cavity for receiving the resilient deformable member that extends along the length of the gripping portion, wherein the body includes a void that extends along the length of the gripping portion, wherein the cavity and the resilient deformable member are shaped complementarily and extend along the length of the gripping portion in unison, and wherein the resilient deformable member is shaped as a helix; and wherein the connector includes a shaft that extends from the coupling portion, the shaft having a first end which at least partially extends into and is maintained in suspension within the void of the body.

2. The handle as claimed in claim 1, wherein the resilient deformable member and the gripping portion are integrated continuously or at discrete positions along the length of each of the resilient deformable member and the gripping portion for flexing in unison.

3. The handle as claimed in claim 2, wherein the resilient deformable member is in engagement with the connector to function as a cantilever for damping vibration from the coupling portion to the gripping portion.

4. The handle as claimed in claim 1, wherein the body includes a void that extends along the length of the gripping portion.

5. The handle as claimed in claim 4, wherein the resilient deformable member, the cavity and the void extend co-axially in the body along the length of the gripping portion.

6. The handle as claimed in claim 5, wherein the resilient deformable member runs around the void in a configuration that the resilient deformable member is displaced at a constant distance from the void along its length.

7. The handle as claimed in claim 4, wherein the void extends along the entire length of the gripping portion.

8. The handle as claimed in claim 1, wherein the connector is in connection with the resilient deformable member via a coupler.

9. The handle as claimed in claim 8, wherein the resilient deformable member is fixedly joined with the coupler to form a one piece structure.

10. The handle as claimed in claim 8, wherein the shaft is inserted into the coupler for coupling therewith.

11. The handle as claimed in claim 8, further including a guard located at an end portion of the coupling portion and in proximity to the coupler for guarding against it.

12. The handle as claimed in claim 11, wherein the guard and the coupler are arranged concentrically on the shaft.

13. The handle as claimed in claim 1, wherein a second end portion of the shaft includes a formation which is received by a receiver of the coupling portion for fixed engagement.

14. The handle as claimed in claim 1, wherein the resilient deformable member extends along substantially the entire length of the gripping portion.

15. The handle as claimed in claim 1, wherein the gripping portion is made of a material selected from a group consisting of an elastomer and a rubber.

16. The handle as claimed in claim 1, wherein the gripping portion and the coupling portion are arranged on a same axis.

17. The handle as claimed in claim 16, wherein the body includes a void that extends along the length of the gripping portion, and wherein the resilient deformable member, the cavity and the void extend along the same axis.

18. The handle as claimed in claim 1, wherein the resilient deformable member is insert molded into the gripping portion, thereby forming the cavity with a helical shape.

19. A handle for use with a power tool, the handle comprising:

a coupling portion configured to detachably couple the handle to the power tool;

a gripping portion in connection with the coupling portion configured to be gripped by a user;

a connector to connect the gripping portion to the coupling portion; and a resilient deformable member that extends along the gripping portion, wherein the gripping portion includes a deformable body and a helical cavity in the deformable body, and wherein the helical cavity receives the resilient deformable member;

wherein the deformable body includes a void that extends along the length of the gripping portion; and wherein the connector includes a shaft that extends from the coupling portion, the shaft having a first end which at least partially extends into and is maintained in suspension within the void of the deformable body.

* * * * *